Figure 1:
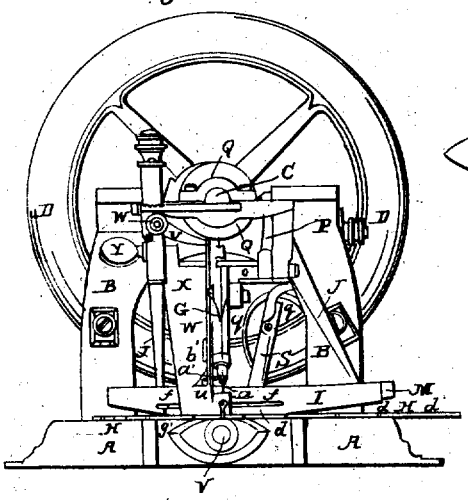

E. HOWE, Jr.

Sewing Machine.

No. 1,154. Reissued March 19, 1861.

Witnesses:
A. B. Livingston
J. Birch

Inventor:
Elias Howe Jr.

UNITED STATES PATENT OFFICE.

ELIAS HOWE, JR., OF BROOKLYN, NEW YORK.

IMPROVEMENT IN SEWING-MACHINES.

Specification forming part of Letters Patent No. 4,750, dated September 10, 1846; extended seven years; Reissue No. 1,154, dated March 19, 1861.

*To all whom it may concern:*

Be it known that I, ELIAS HOWE, Jr., of Brooklyn, Kings county, State of New York, and formerly of Cambridge, in the county of Middlesex and State of Massachusetts, have invented a new and useful machine for sewing seams in cloth or other articles requiring to be sewed; and I do hereby declare that the following is a full and exact description thereof.

In sewing a seam with my machine two threads are employed, one of which threads is carried through the cloth by means of a curved needle, the pointed end of which is to pass through said cloth. The needle used has the eye that is to receive the thread within a small distance—say an eighth of an inch—of its inner or pointed end, with a groove to receive and protect the thread in the rapid movement of the needle through the fabric to be sewed, running back from the eye to the heel on both sides. The other or outer end of the needle is held by an arm that vibrates on a pivot or joint pin, and the curvature of the needle is such as to correspond with the length of the arm as its radius. When the thread is carried through the cloth, which may be done to the distance of about three-fourths of an inch, the thread will be stretched above the curved needle something in the manner of a bow-string, leaving a small open space between the two. A small shuttle carrying a bobbin filled with silk or thread is then made to pass entirely through the open space between the needle and the thread which it carries, and when the shuttle is returned, which is done by means of a picker-staff or shuttle-driver, the thread which was carried in by the needle is surrounded by that received from the shuttle, and as the needle is drawn out it forces that which was received from the shuttle into the body of the cloth, and as this operation is repeated a seam is formed which has on each side of the cloth the same appearance as that given by stitching, with this peculiarity, that the thread shown on one side of the cloth is exclusively that which was given out by the needle, and the thread seen on the other side is exclusively that which was given out by the shuttle. It will therefore be seen that a stitch is made at every back-and-forth movement of the shuttle. The two thicknesses of cloth that are to be sewed are held upon pointed wires which project out from a metallic plate, like the teeth of a comb, but at a considerable distance from each other—say three-fourths of an inch, more or less—these pointed wires sustaining the cloth and answering the purpose of ordinary basting. The metallic plate from which these wires project has numerous holes through it, which answer the purpose of rack-teeth in enabling the plate to be moved forward, by means of a pinion, as the stitches are taken. The distance to which said plate is moved, and consequently the length of the stitches, may be regulated at pleasure.

Figure 2:
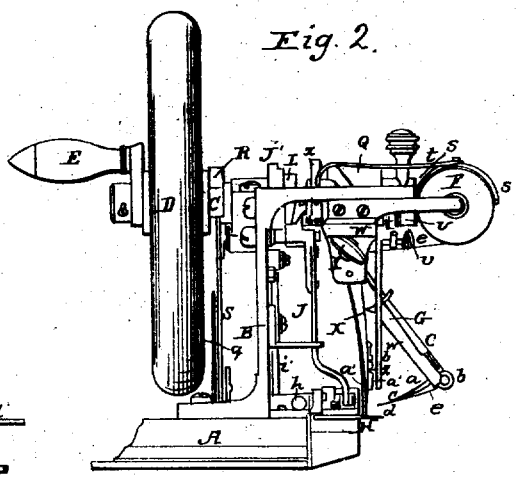

In the accompanying drawings, Figure 1 is a front elevation of the machine; Fig. 2, an end elevation thereof, and Fig. 3 a top view. The other figures represent sections and parts in detail, which will be presently explained.

A A is the bed or base of the machine, and B B standards rising therefrom, which sustain the main shaft and other parts of the apparatus.

C C is the main shaft, which carries the cams that operate the needle, the shuttle-drivers, and other parts of the machine.

D is a fly-wheel, and E a winch on said shaft.

F is a bobbin, on which the silk is wound that is to supply the needle.

G is the needle-arm that carries the curved needle *a*. This is seen most distinctly in the end elevation, Fig. 2. The thread from the bobbin F passes round a small friction-roller, *b*, or round a smooth groove in the situation of said roller, then up through the eye of the needle at *c*, which eye is situated near to the needle-point. The cloth is stuck on the points *d d*, that project from the metallic plate H, which I will call the "baster-plate." This plate is shown most distinctly in the top view, Fig. 3. When the thread *e* is carried through the cloth by the needle *a*, the upper portion of said thread will be above the needle, and will allow the point of the shuttle (to be presently described) to pass between them to enable it to enter readily. The needle, after entering the cloth, is immediately drawn back to a short distance, which opens the loop slightly, the cam which operates the needle-arm being so formed as to cause such drawing back. The shuttle will, in order to give itself the necessary room, draw a portion of thread which had been given out by the needle through the cloth, said thread having been left in a loop or slack state for that purpose.

Figure 4:
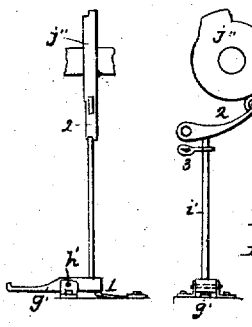
Figure 9:
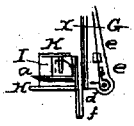
Figure 5:
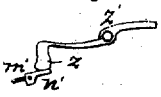
Figure 7:
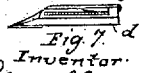

Fig. 4 represents a part of the same portion of the machine that is shown in Fig. 2, but with the needle-arm down and with the needle passed through the cloth. *f* is the cloth seen in section, but not shown in any of the other figures. *e'* is the loop or slack thread formed on the outside of the cloth, and which is to be drawn through it by the passing of the shuttle. I in the respective figures is the shuttle box or trough, within which the shuttle is moved back and forth by means of the picker-staves or shuttle-drivers J J. In Fig. 5 I have given a top view of this box with the shuttle K within it. This shuttle is in its general construction similar to the larger shuttles used in weaving, excepting it has but one point, formed, as shown in Fig. 7, by the forward end of the needle side extended, and fitted to run in a longitudinal groove in the bottom of the shuttle-box, even with the upper part of the needle received in the cross-groove, to insure the interlocking of the threads; and its spool *g* is capable of containing an ordinary skein of silk. A clasp-spring applied to the shuttle and its spool, as shown in Fig. 7, regulates the unwinding of the thread. The shuttle-box I is represented as made convex on its under side, by which it is adapted to admit a baster-plate that may be in a curved form, although for most purposes a straight baster-plate may be used. The pieces marked *i i* are light springs above the shuttle, which bear slightly upon it and serve to steady its motion. The shuttle-drivers work on joint-pins, as shown at *j*, Fig. 2, there being a corresponding fixture for the drivers on the other side.

Figure 3:
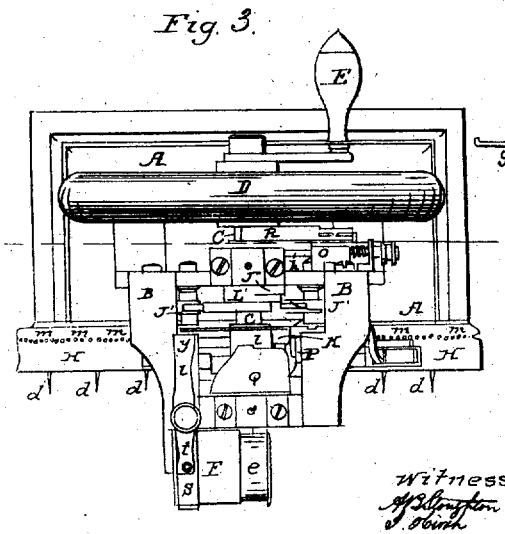

L, Fig. 3, is the cam that operates the shuttle-drivers, on the upper ends of which drivers there may be friction-rollers, *j' j'*. The cam L acts upon the shuttle-drivers alternately. The shuttle-drivers, when not acted on by the cams, are held in position by springs.

M, Fig. 5, is a sliding box, fitted into the shuttle-box, and moved back and forth in the rear of the shuttle by one of the drivers; and N is a corresponding sliding piece moved by the other driver, and adapted to the fore or pointed end of the shuttle. This piece, after each forward movement, is withdrawn by a spring acting on the upper end of its driver, so as not to interfere with the proper action of the needle and its thread.

The needle-arm is attached to the rock-shaft O, Fig. 1, which vibrates on a center pin or pivot, and from this shaft rises an arm, P, that carries a pin and friction-roller, *k*, which enters a space, *l*, in the cam Q, which space operates as a zigzag groove, and is of course so formed as to give the proper vibration to the needle-arm. There is a groove or narrow channel made across the bottom of the shuttle-box to receive the needle, in order that its upper part may be even with said bottom, and allow the shuttle to pass freely over it.

The baster-plate H, Fig. 3, which receives the cloth to be sewed, is furnished with a row of small holes, *m m*, drilled at a regular distance from each other, serving the purpose of rack-teeth, and into these round pinion-teeth enter for the purpose of carrying the plate forward to a proper distance at every stitch. The baster-plate is held down upon these pinion-teeth by a suitable spring.

Figure 6:
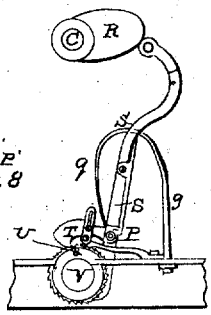

Fig. 6 shows the principal portion of the feeding apparatus as it would appear were a vertical section made through the machine in the line *x x* of Fig. 3. R is a cam on the cam-shaft C, that vibrates an arm, S, carrying a feeding-claw, T, that takes into a ratchet-wheel, U, on the shaft V, which shaft crosses the bed A of the machine, its fore end being seen at V, Fig. 1. This shaft has on it, near its fore end, the pinion that carries the pins or teeth that take into the holes *m* in the baster and cause it to advance between every stitch.

The length of the stitch may be regulated by regulating the play of the arm S, and this is effected by the regulating-screw *n*, Fig. 3, that moves a pin back and forth that serves as a stop to said arm. The pin is represented by the dot *o*, Fig. 6, and is seen at *o*, Figs. 2 and 3.

*p* is a spring that retains the ratchet-wheel in place as the claw is taking a new hold. *q* is a spring for holding the arm S against the cam.

In sewing with this machine the thread from the bobbin F is passed over a notch, *r*, Fig. 1, at the upper end of the needle-arm, and is returned through the notch *r'*. It then passes down in front of said arm, then around the roller *b*, and through the needle-eye. To regulate the giving out of the thread from the bobbin, friction is made on it by the semicircular clasp *s*, that is made to press on it by a spring, *t*, regulated by a tempering-screw. Before the needle passes through the cloth the thread which extends from the needle-eye to said cloth is raised or drawn up by a lifting-pin, so as to form the loop or slack, which is subsequently to be drawn in by the passing of the shuttle between the thread and the needle, and also to prevent entanglement with the needle and to insure the uniform laying of the stitches.

W, Figs. 1 and 2, is a lifting-rod, from the side of which projects the lifting-pin *u*. The lifting-rod is attached at its upper end to a crank-arm, *v*, which works on a shaft, *w*, and this shaft is made to vibrate by means of the cam *x* on the cam-shaft. This cam operates on a friction-roller, *y*, on a short arm on the inner end of the shaft W. The lifting-rod stands in front of a plate, X, Figs. 1 and 2, which is attached at its upper end to the frame of the machine, and between the lower end of this plate and the shuttle-box the cloth is to pass. The plate X is furnished with a hinge-joint at its upper end, in order that its distance from the shuttle-box may be regulated to suit cloth of different thicknesses. Y, Fig.

1, is a set-screw by which it is held in place. The inner surface of the plate X is slightly beveled, as shown in Fig. 2, to facilitate the entrance and passage of the cloth between it and the shuttle-box. These opposing local surfaces of the plate X and the shuttle-box having a suitable passage for the needle with its thread are smooth, and hold the cloth in position at the place of sewing under the action of the other parts of the machine, and they specially aid the needle and shuttle to form and tighten the successive stitches in the cloth alike, and they also specially aid the baster-plate to hold and guide the cloth forward on its points in the line of seaming.

From the back part of the lifting-rod proceeds a guide-pin, *z*, that moves the lifting-rod laterally, so as to govern the action of the lifting-pin *u*. This guide-pin works against guide-pieces *a′ b′*, affixed on the front of the plate X. The dotted lines show the groove formed by the pieces *a′ b′*, along which the guide-pin is to pass. The lifting-rod is carried toward the piece *b′* by means of a spiral spring around its shaft, or in any other convenient mode. In the position in which the apparatus is shown in Fig. 1 the lifting-pin is partially raised, and will have lifted the thread. In raising it the guide-pin passes through the groove between *a′ b′*, (shown by dotted lines,) and when at the upper end of this groove the needle-arm acts and carries the needle through the cloth.

On the side of the needle-arm there is a projecting piece, C′, the inclined edge of which, coming in contact with the lifting-rod, pushes it laterally over the angular point of the piece *a′*, and the crank-arm V descending at this moment, the lifting-pin is withdrawn from the thread which is thereby left slack to a sufficient extent for the purpose designated.

The shuttle shown separately in Fig. 7 has a hole, *d′*, through its side for the thread to pass from the spool, and a slot, *f′ f″*, is made through the side of the shuttle-box to allow of the play of the shuttle-thread back and forth. At the time when the shuttle has completed its passage between the needle and its thread, the needle is to be withdrawn from the cloth, and when this is taking place it is necessary that the shuttle-thread should be held firmly, or the withdrawing of the needle, instead of drawing the shuttle-thread firmly into the body of the cloth and making a perfect seam, would draw a portion of it from the spool and cause it to pass entirely through said cloth.

In Fig. 1, *g′* is the outer end of a lever which is made to rise at the proper moment, and to clip the thread between it and the upper edge of the slot *f′*. This lever is seen in Fig. 2, its fulcrum being at *h′*. The rod *i′* serves to depress the inner end of said lever, which is held up by a spring, 1, and to raise its outer end, the cam *j″* on the cam-shaft performing this office by acting on a spring-treadle, 2, resting on the upper end of said rod, held by an adjustable guide, 3, whereby the pressure of said treadle is regulated.

Figure 8:
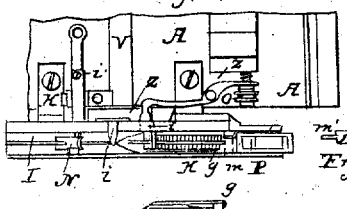

The sliding box M does not bear directly against the rear end of the shuttle, but has a pin, *m′*, projecting from its fore end, which pin acts against the shuttle. The pin *m′* constitutes a part of a small lever shown separately in Fig. 8. The part *n′* of this lever is received within a suitable slot in the sliding box M, and it turns on a fulcrum-pin, *p′*. When the shuttle has passed through the loop formed by the needle-thread, said loop is received upon the pin *m′*, and as the needle is retracted the thread will be drawn taut upon said pin. At this time the head of an adjustable spring-piece, Z Z′, bears against the end *n′* of the small lever, and the force of its pressure has to be overcome before the thread escapes from the pin, which it does by drawing over against the power of the spring. As the loop then escapes, it will draw up the filling-thread from the shuttle firmly against the cloth and embed it within it. The head of the spring Z passes through a mortise in the shuttle-box, as shown by the dotted lines.

O′ is an adjusting-screw by which the force of the spring Z may be regulated.

The aforesaid machinery, arranged and co-operating as described, constitutes my new machine, which sews a firm seam automatically, and is designed to take the place of hand-sewing.

Having thus fully described the manner in which I construct my machine for sewing seams, and shown the operation thereof, what I claim as new, and desire to secure by Letters Patent, is as follows:

1. A sewing-machine, constructed and operating to form a seam, substantially as described.
2. The combination of a needle and a shuttle, or equivalent, and holding-surfaces, constructed and operating substantially as described.
3. The combination of holding-surfaces with a baster-plate or equivalent, constructed and operating substantially as described.
4. A lifting-rod, a clipper-lever, and a receiving-pin, respectively, each constructed and operating to control the threads, substantially as described.
5. A baster-plate, constructed and operating substantially as described.
6. Holding-surfaces, constructed and operating substantially as described.
7. A grooved and eye-pointed needle, constructed and adapted for rapid machine-sewing, substantially as described.
8. A side-pointed shuttle, constructed and operating substantially as described.

ELIAS HOWE, JR.

Witnesses:
W. H. PLUMMER,
A. MARKS.